(12) United States Patent
Sassi

(10) Patent No.: US 6,789,805 B2
(45) Date of Patent: Sep. 14, 2004

(54) SEALING ASSEMBLY FOR RELATIVELY ROTATING MECHANICAL MEMBERS

(75) Inventor: Mauro Sassi, Moncalieri (IT)

(73) Assignee: RFT S.p.A., Turin (IT)

( * ) Notice: Subject to any disclaimer, the term of this patent is extended or adjusted under 35 U.S.C. 154(b) by 0 days.

(21) Appl. No.: 10/141,873

(22) Filed: May 10, 2002

(65) Prior Publication Data

US 2002/0185819 A1 Dec. 12, 2002

(30) Foreign Application Priority Data

May 10, 2001 (IT) .................................. MI2001A0963

(51) Int. Cl.[7] .............................................. F16J 15/32
(52) U.S. Cl. ...................................... 277/549; 277/560
(58) Field of Search ................................ 277/549, 551, 277/555, 559, 560, 561, 572

(56) References Cited

U.S. PATENT DOCUMENTS

| | | | |
|---|---|---|---|
| 3,771,799 A | * 11/1973 | Sekulich et al. | 277/346 |
| 4,283,063 A | * 8/1981 | Prescott | 277/353 |
| 4,470,605 A | * 9/1984 | Deuring | 277/309 |
| 4,568,092 A | * 2/1986 | Hayashida et al. | 277/559 |
| 4,770,425 A | * 9/1988 | Colanzi et al. | 277/353 |
| 4,928,371 A | * 5/1990 | Colanzi et al. | 29/898.064 |
| 5,096,207 A | * 3/1992 | Seeh et al. | 277/353 |
| 5,346,662 A | 9/1994 | Black et al. | |
| 5,348,312 A | 9/1994 | Johnston | |
| 5,522,600 A | * 6/1996 | Duckwall | 277/402 |
| 5,615,894 A | * 4/1997 | vom Schemm | 277/559 |
| 6,149,158 A | 11/2000 | Tripathy | |
| 6,273,428 B1 | * 8/2001 | Sassi | 277/348 |
| 6,406,026 B1 | * 6/2002 | Oldenburg | 277/353 |
| 6,450,503 B1 | * 9/2002 | Dossena et al. | 277/572 |
| 6,513,810 B1 | * 2/2003 | Pataille | 277/549 |

FOREIGN PATENT DOCUMENTS

DE          100 50 983 A1     5/2002

\* cited by examiner

*Primary Examiner*—William L. Miller
(74) *Attorney, Agent, or Firm*—Burns, Doane, Swecker & Mathis, L.L.P.

(57) ABSTRACT

A sealing assembly for relatively rotating mechanical members, having a first and a second shield member fitted respectively to a first and a second of the relatively rotating members; and a low-friction-coefficient sealing member. The sealing member has a sealing portion cooperating with the first shield member; a root portion carried integrally by the second shield member; and a connecting portion shaped to define a hinge region between the root portion and the sealing portion.

10 Claims, 3 Drawing Sheets

SEALING ASSEMBLY FOR RELATIVELY ROTATING MECHANICAL MEMBERS

The present invention relates to a sealing assembly for relatively rotating mechanical members.

BACKGROUND OF THE INVENTION

As is known, in normally used sealing assemblies, a substantially annular sealing member is interposed between a first and a second shield, which are fitted respectively to a first and a second member in relative rotation, e.g. a shaft and respective seat.

The sealing member, which is carried integrally by a first of the shields, has one or more sealing lips, which cooperate in sliding manner with respective portions of a second of the shields, with respect to which the sealing member is movable. Obviously, choosing the right material for the sealing member is vitally important, by possibly affecting performance of the sealing assembly as a whole.

Highly elastic elastomeric materials are normally used, or preferably PTFE, which, compared with elastomeric materials, has numerous advantages: better high-temperature, oil, and wear resistance; and a lower friction coefficient.

On the other hand, use of PTFE is limited on account of its plastic behavior, i.e. its tendency to deform permanently. In the case of conventional sealing assemblies, in particular, radial-lipped PTFE sealing members may pose problems, especially in the presence of static eccentricity of the shaft-seat connection, or dynamic eccentricity of the shaft. In which cases, in fact, the poor elasticity of PTFE prevents adequate absorption by the sealing member of the undesired movement caused by such eccentricity, thus impairing operation of the sealing assembly as a whole.

SUMMARY OF THE INVENTION

It is an object of the present invention to provide a sealing assembly designed to eliminate the aforementioned drawbacks, and which at the same time is cheap and easy to produce.

According to the present invention, there is provided a sealing assembly for relatively rotating mechanical members, comprising a first and a second shield member fitted respectively to a first and a second of said relatively rotating members; and a low-friction-coefficient sealing member having a sealing portion cooperating with said first shield member, and a root portion carried integrally by said second shield member; characterized in that said sealing member also comprises a connecting portion shaped to define a hinge region between said root portion and said sealing portion.

In other words, the connecting portion forming a hinge between the root portion and the sealing portion provides for increasing the flexibility of the sealing member. This is particularly advantageous when the sealing member is made of PTFE, by enabling exploitation of the properties of PTFE (low friction coefficient, good wear, high-temperature, and oil resistance) while at the same time enhancing the elastic performance of the sealing member.

According to a further aspect of the invention, said sealing portion defines an axial sealing lip cooperating with an annular projection of said first shield member.

As such, the sealing assembly provides for effectively absorbing any undesired movement caused by mechanical defects, such as eccentricity of the shaft or shaft-seat connection.

According to the invention, the sealing assembly also comprises a toroidal spring housed about said sealing member, between said sealing portion and a first conical portion of said second shield member, which form a V-shaped groove; said spring pushing said sealing portion against said annular projection of said first shield member.

The toroidal spring advantageously provides, on the one hand, for loading the sealing member to achieve a given sealing pressure, and, on the other, for improving the elastic performance of the sealing member and preventing accidental detachment of the sealing portion from the annular projection as a result of any relative axial movement (possible in the presence of slack) between the first and second shield member.

BRIEF DESCRIPTION OF THE DRAWINGS

A number of non-limiting embodiments of the invention will be described by way of example with reference to the accompanying drawings, in which.

DETAILED DESCRIPTION OF THE INVENTION

Figure 1:
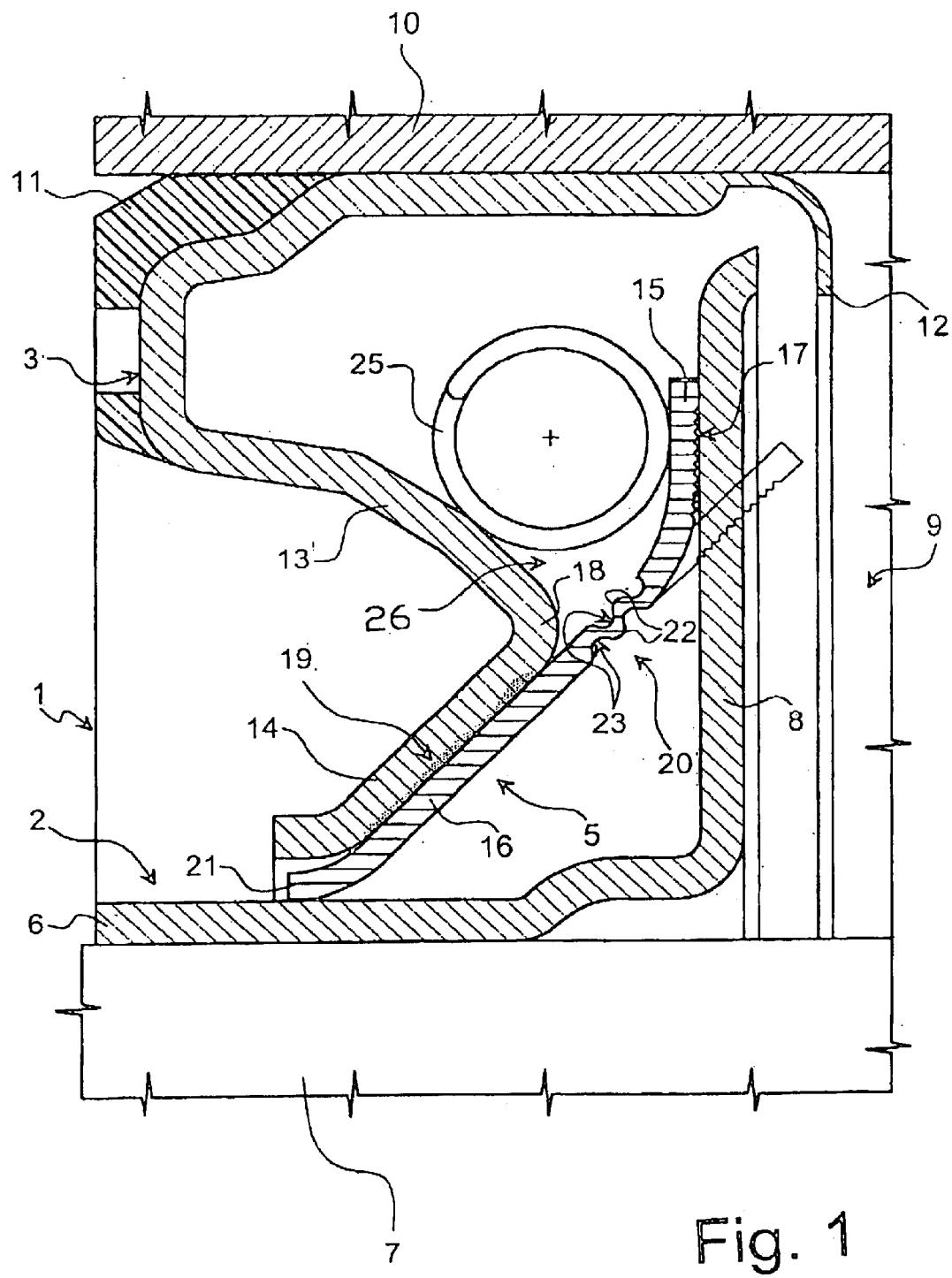
FIG. 1 shows an axially-sectioned side view of a first embodiment of the sealing assembly according to the present invention.

Number 1 in FIG. 1 indicates a sealing assembly for relatively rotating mechanical members, comprising a first and a second shield member 2, 3, and a sealing member 5 (sealing assembly 1 being cylindrically symmetrical, only half is shown in FIG. 1).

First shield member 2, e.g. a wear bush, comprises a cylindrical portion 6 integral with a first of the relatively rotating mechanical members (e.g. a shaft 7); and an annular projection 8 at the end located, in use, inside second shield member 3.

Second shield member 3 is substantially annular, is fitted to first shield member 2, and is interference-fitted inside a seat 9 of a second of the relatively rotating mechanical members, e.g. the casing of a motor 10 for rotating shaft 7 and here shown only schematically. Seat 9 contains lubricating fluid (not shown).

An outer surface 10 of second shield member 3 is contoured and partly covered with a strip 11 of elastomeric material applied by means of a curing process, and has a tapered edge 12 bent inwards to prevent mutual detachment of shield members 2, 3.

Second shield member 3 also comprises a first and a second conical portion 13, 14, which are oppositely inclined and connected to each other to define, along a radial section, a V-shaped profile with its vertex 18 facing inwards of second shield member 3.

Sealing member 5 is carried integrally by second shield member 3, is made of low-friction-coefficient material, preferably PTFE, and is substantially truncated-cone-shaped. More specifically, sealing member 5 comprises a sealing portion 15 forming an axial sealing lip cooperating with annular projection 8 of first shield member 2; and a root portion 16 joined to sealing portion 15 by a connecting portion 20. The surface of sealing portion 15 facing annular projection 8 of first shield member 2 preferably comprises one-way helical grooves 17 for imparting to any leaking lubricating fluid a spinning motion inwards of seat 9.

Root portion 16 is made integral with second conical portion 14 of second shield member 3 by means of a layer of adhesive 19.

A radial sealing lip 21 extends from root portion 16, on the opposite side to sealing portion 15, and cooperates with cylindrical portion 6 of first shield member 2.

Connecting portion 20 of sealing member 5 is shaped to define a hinge between sealing portion 15 and root portion 16, is thinner than sealing portion 15 and root portion 16, and comprises a number of radial undulations 22 defined by offset circumferential grooves 23 on opposite faces of sealing member 5. In a preferred embodiment of the invention, two undulations 22 with substantially sinusoidal profiles are provided.

Sealing assembly 1 also comprises a toroidal spring 25 housed about sealing member 5, between sealing portion 15 and first conical portion 13 of second shield member 3, which form a substantially V-shaped groove 26.

When first shield member 2 is inserted inside second shield member 3, annular projection 8 pushes against sealing portion 15 of sealing member 5, and the thinner undulated connecting portion 20 flexes, so that sealing portion 15 is positioned facing and against annular projection 8, thus forming an axial seal (the fine line in FIG. 1 shows the position of sealing portion 15 prior to assembly).

Toroidal spring 25 presses sealing portion 15 of sealing member 5 against annular projection 8 of first shield member 2, i.e. enhances the elastic performance of sealing member 5 by encouraging springback of sealing portion 15 to the rest position, thus preventing accidental detachment of sealing portion 15 from annular projection 8—e.g. due to axial slack in the coupling of first and second shield members 2, 3—and so providing for more effective axial sealing.

Figure 2:
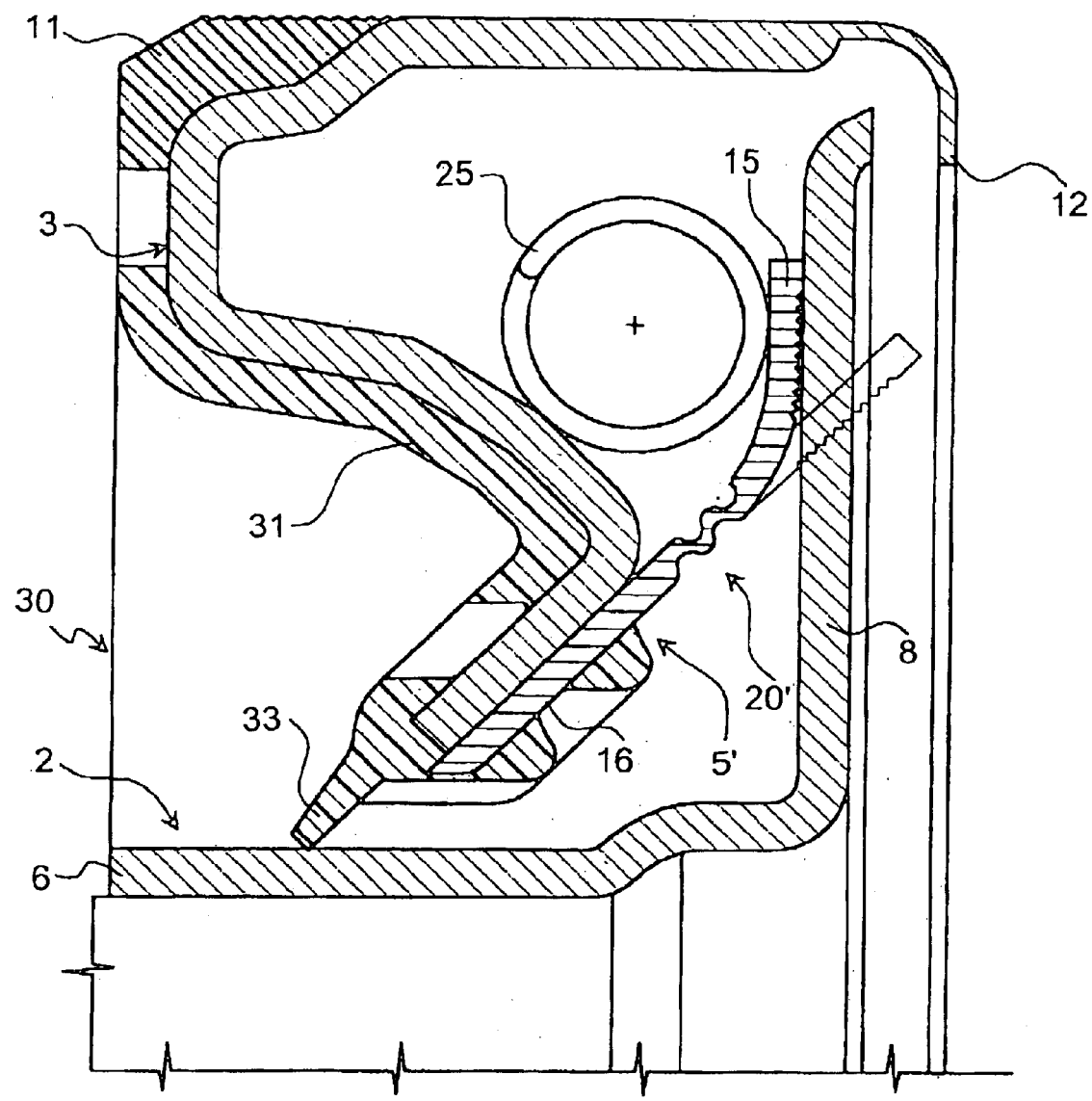
FIG. 2 shows an axially-sectioned side view of a second embodiment of the sealing assembly according to the present invention.

FIG. 2 shows a second embodiment of the invention, any parts of which similar to those in FIG. 1 are indicated using the same reference numbers. In this case, a sealing assembly 30 comprises first and second shield members 2, 3, a sealing member 5', toroidal spring 25, and an elastomeric static sealing member 31.

Sealing member 5' is substantially similar to sealing member 5, comprises sealing portion 15, root portion 16 and connecting portion 20, as in FIG. 1, but has no radial sealing lip 21.

Elastomeric static sealing member 31 covers the outside of first and second conical portion 13, 14 of second shield member 3, and forms a radial sealing lip 33 cooperating with the cylindrical portion of first shield member 2; and root portion 16 of sealing member 5' is co-molded with and partly embedded inside elastomeric static sealing member 31, and so made integral with second conical portion 14.

Figure 3:
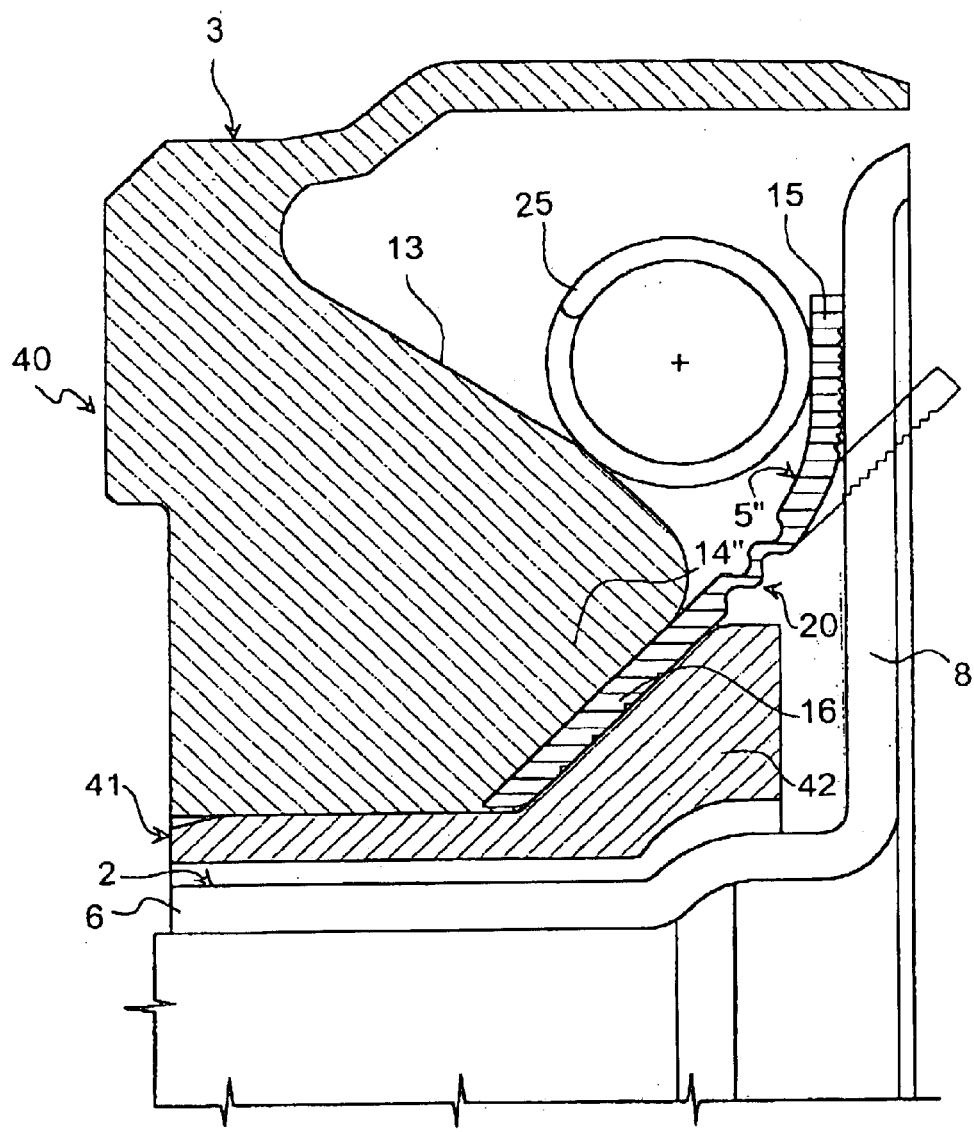
FIG. 3 shows an axially-sectioned side view of a third embodiment of the sealing assembly according to the present invention.

In a further embodiment of the invention, described below with reference to FIG. 3, a sealing assembly 40 comprises first and second shield member 2, 3, a sealing member 5", toroidal spring 25, and a fastening bush 41.

Fastening bush 41 is fitted, angularly movable, to first shield member 2, is interference-fitted to second shield member 3, and comprises a third conical portion 42 having a profile substantially mating with the profile of the second conical portion 14" of second shield member 3. In actual use, root portion 16 of sealing member 5" is gripped between second conical portion 14 and third conical portion 42.

Clearly, changes may be made to the sealing assembly as described herein without, however, departing from the scope of the present invention.

What is claimed is:

1. A sealing assembly for relatively rotating mechanical members, comprising:
    a first and a second shield member fitted respectively to a first and a second of said relatively rotating members; and
    a low-friction-coefficient sealing member having a sealing portion cooperating with said first shield member, a root portion carried integrally by said second shield member, and a connecting portion shaped to define a hinge region between said root portion and said sealing portion;
    said connecting portion being thinner than said sealing portion and said root portion and comprising a number of radial undulations defined by offset circumferential grooves on opposite faces of said connecting portion; and
    a torroidal spring housed about said sealing member and resting against said sealing portion and a first conical portion of said second shield member which form a V-shaped groove, said toroidal spring pushing said sealing portion against an annular projection of said first shield member.

2. A sealing assembly as claimed in claim 1, wherein said sealing portion defines an axial sealing lip cooperating with said annular projection of said first shield member.

3. A sealing assembly as claimed in claim 1, wherein said sealing portion of said sealing member comprises one-way helical grooves.

4. A sealing assembly as claimed claim 3, comprising a radial sealing lip extending from said root portion, on the opposite side to said sealing portion (46), and cooperating with a cylindrical portion of said first shield member.

5. A sealing assembly as claimed in claim 1, wherein said second shield member comprises a second conical portion; said root portion of said sealing member being connected integrally to said second conical portion of said second shield member.

6. A sealing assembly as claimed in claim 5, wherein said root portion is made integral with said second conical portion of said second shield member by a layer of adhesive.

7. A sealing assembly as claimed in claim 5, comprising an elastomeric static sealing member; said root portion of said sealing member being co-molded with and partly embedded in said elastomeric static sealing member.

8. A sealing assembly as claimed in claim 5, comprising a fastening bush fitted to said first shield member; said fastening bush being interference-fitted to said second shield member so as to grip said root portion between a third conical portion of its own and said second conical portion; said third conical portion having a profile substantially mating with the profile of said second conical portion.

9. A sealing assembly as claimed in claim 1, wherein said sealing member is made of PTFE.

10. A sealing assembly as claimed in claim 1, wherein portions of said sealing member on either side of said connecting portion are devoid of the radial undulations.

* * * * *